(12) United States Patent
Kandala et al.

(10) Patent No.: US 10,755,193 B2
(45) Date of Patent: Aug. 25, 2020

(54) IMPLEMENTATION OF ERROR MITIGATION FOR QUANTUM COMPUTING MACHINES

(71) Applicant: International Business Machines Corporation, Armonk, NY (US)

(72) Inventors: Abhinav Kandala, Yorktown Heights, NY (US); Paul Kristan Temme, Ossining, NY (US); Jay M. Gambetta, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 73 days.

(21) Appl. No.: 16/207,556

(22) Filed: Dec. 3, 2018

(65) Prior Publication Data
US 2020/0175409 A1    Jun. 4, 2020

(51) Int. Cl.
*G06N 10/00* (2019.01)
*G06F 11/07* (2006.01)

(52) U.S. Cl.
CPC .......... *G06N 10/00* (2019.01); *G06F 11/0793* (2013.01)

(58) Field of Classification Search
CPC .... G06N 10/00; G06N 99/00; G06F 11/0721; G06F 11/079; G06F 11/0793
See application file for complete search history.

(56) References Cited

U.S. PATENT DOCUMENTS

| | | | |
|---|---|---|---|
| 7,307,275 B2 | 12/2007 | Lidar et al. | |
| 7,583,438 B2 | 9/2009 | Tomita | |
| 8,242,799 B2 | 8/2012 | Pesetski et al. | |
| 8,311,673 B2 | 11/2012 | Boe et al. | |
| 9,495,644 B2 | 11/2016 | Chudak et al. | |
| 10,474,960 B1* | 11/2019 | Bishop | H03K 19/195 |
| 2018/0032893 A1* | 2/2018 | Epstein | G06N 10/00 |

FOREIGN PATENT DOCUMENTS

WO    2017062958 A1    4/2017

OTHER PUBLICATIONS

Vojtech Havlicek et al.,"Supervised learning with quantum enhanced feature spaces", Department of Computer Science, University of Oxford, Apr. 30, 2018, https://arxiv.org/pdf/1804.11326.pdf.

\* cited by examiner

*Primary Examiner* — Joseph R Kudirka
(74) *Attorney, Agent, or Firm* — Garg Law Firm, PLLC; Rakesh Garg; Keivan Razavi

(57) ABSTRACT

One or more time correlations of noise within a quantum computing circuit of a quantum processor are determined. The quantum computing circuit includes one or more qubits. A coherence time for each qubit is determined, and one or more stretch factors are determined based upon the time correlations of the noise and the coherence times. A first loop is initialized that performs for each of the stretch factors: initializing the qubits to a ground state, executing the quantum computing circuit with a the stretch factor, performing one or more single-qubit post-rotations associated with one or more expectation values, measuring a state of each qubit to determine the one or more expectation values of interest, and resetting each qubit to the ground state. A mitigated estimate is determined for the expectation values based upon an extrapolation of the expectation values determined for each stretch factor.

20 Claims, 12 Drawing Sheets

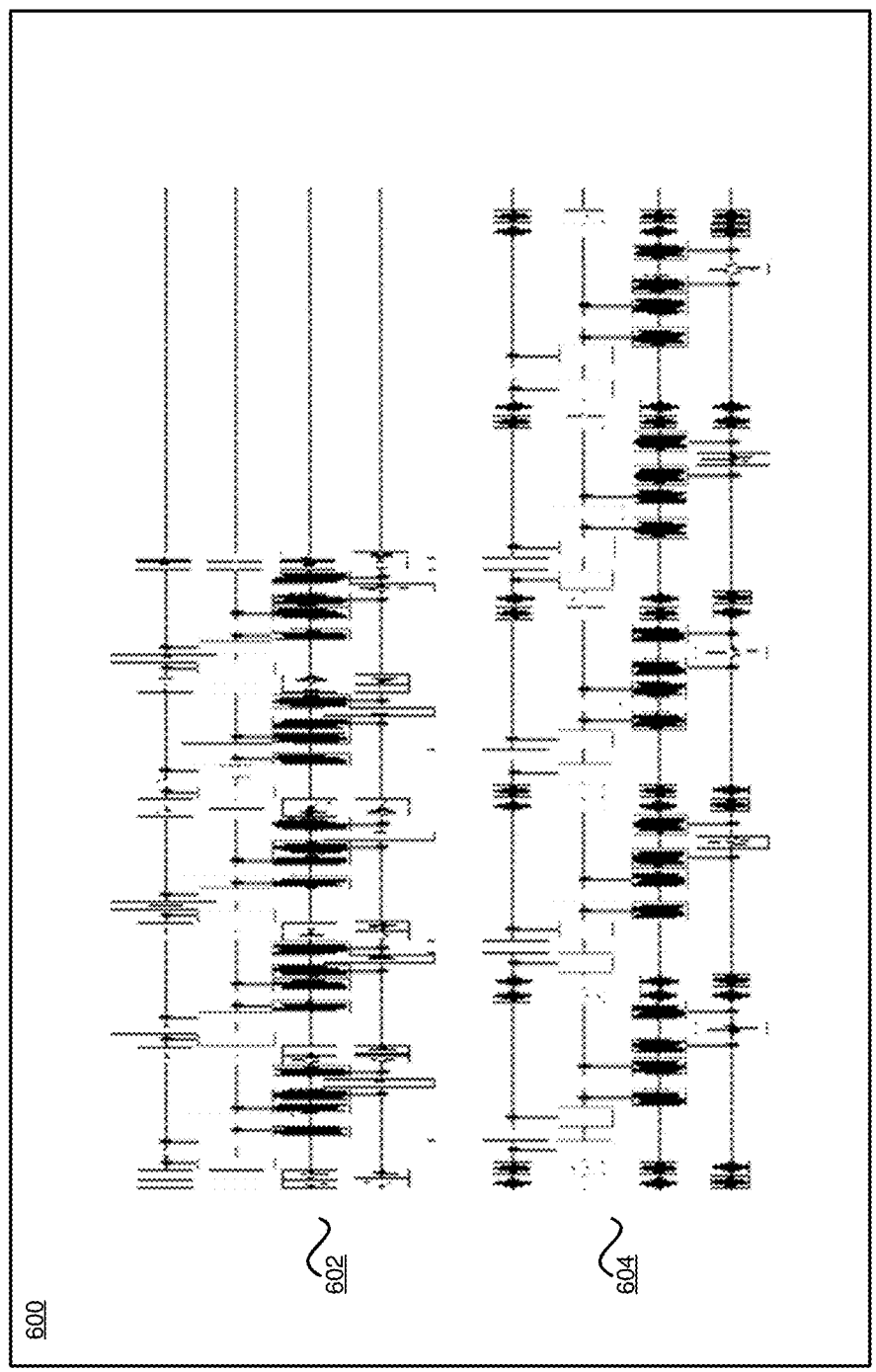

IMPLEMENTATION OF ERROR MITIGATION FOR QUANTUM COMPUTING MACHINES

TECHNICAL FIELD

The present invention relates generally to a method, system, and computer program product for using quantum computing systems. More particularly, the present invention relates to a method, system, and computer program product for implementation of error mitigation for quantum computing machines.

BACKGROUND

Hereinafter, a "Q" prefix in a word of phrase is indicative of a reference of that word or phrase in a quantum computing context unless expressly distinguished where used.

Nature—including molecules—follows the laws of quantum mechanics, a branch of physics that explores how the physical world works at the most fundamental levels. At this level, particles behave in strange ways, taking on more than one state at the same time, and interacting with other particles that are very far away. Quantum computing harnesses these quantum phenomena to process information.

The computers we use today are known as classical computers (also referred to herein as "conventional" computers or conventional nodes, or "CN"). A conventional computer uses a processor fabricated using semiconductor technology, a semiconductor memory, and a magnetic or solid-state storage device, in what is known as a Von Neumann architecture. Particularly, the processors in conventional computers are binary processors, i.e., operating on binary data represented in 1 and 0.

A quantum processor (q-processor) uses the odd nature of entangled qubit devices (compactly referred to herein as "qubit," plural "qubits) to perform computational tasks. In the particular realms where quantum mechanics operates, particles of matter can exist in multiple states-such as an "on" state, an "off" state, and both "on" and "off" states simultaneously. Where binary computing using semiconductor processors is limited to using just the on and off states (equivalent to 1 and 0 in binary code), a quantum processor harnesses these quantum states of matter to output signals that are usable in data computing.

Conventional computers encode information in bits. Each bit can take the value of 1 or 0. These 1s and 0s act as on/off switches that ultimately drive computer functions. Quantum computers, on the other hand, are based on qubits, which operate according to two key principles of quantum physics: superposition and entanglement. Superposition means that each qubit can represent both a 1 and a 0 at the same time. Entanglement means that qubits in a superposition can be correlated with each other in a non-classical way; that is, the state of one (whether it is a 1 or a 0) can depend on the state of another, and that there is more information that can be ascertained about the two qubits when they are entangled than when they are treated individually. Using these two principles, qubits operate as more sophisticated processors of information, enabling quantum computers to function in ways that allow them to solve difficult problems that are intractable using conventional computers. IBM has successfully constructed and demonstrated the operability of a quantum processor (IBM is a registered trademark of International Business Machines corporation in the United States and in other countries.)

A large roadblock to the development of universal quantum computers is their sensitivity to noise and errors. Theoretically, noise and error sensitivity can be remedied with quantum error correction (QEC) if decoherence and error rates are below a certain threshold. However, in practice, the implementation of a fault tolerant quantum computing architecture is beyond the scope of near-term quantum hardware.

The applicability of near term quantum computers, even before the advent of full fault tolerance, is a problem of great interest. One area of great potential is quantum simulation in which one controllable quantum system is used to study the properties of another quantum system. For example, the application of quantum simulation to electronic structure problems often involves estimating the lowest energy state of a molecular Hamiltonian. Such simulations typically involve the preparation of a quantum state, using a short-depth circuit, and measuring the expectation value of an observable of interest. However, decoherence during state preparation affects the accuracy of the estimated expectation value.

SUMMARY

The illustrative embodiments provide a method, system, and computer program product. An embodiment of a method includes determining one or more time correlations of noise within a quantum computing circuit of a quantum processor. In the embodiment, the quantum computing circuit includes one or more qubits. The embodiment includes determining a coherence time for each qubit, and determining one or more stretch factors based upon the time correlations of the noise and the coherence times. The embodiment includes initializing a first loop. In the embodiment, the first loop performs for each of the stretch factors: initializing the qubits to a ground state, executing the quantum computing circuit with a the stretch factor, performing one or more single-qubit post-rotations associated with one or more expectation values, measuring a state of each qubit to determine the one or more expectation values of interest, and resetting each qubit to the ground state. The embodiment further includes determining a mitigated estimate for the expectation values based upon an extrapolation of the expectation values determined for each stretch factor. Thus, the embodiment provides for the implementation of error mitigation of short-depth quantum computing circuits to significantly enhance the power of near-term quantum computers for computations based upon expectation values.

Another embodiment includes initializing a second loop, the second loop repeating the first loop for a predetermined number of the expectation values of interest. Thus, the embodiment provides improved accuracy of error mitigation estimates by repeating the first loop for a number of expectation values of interest.

Another embodiment includes initializing a third loop, the third loop repeating the second loop for a predetermined number of samples. Thus, the embodiment provides improved accuracy of error mitigation estimates by repeating the second loop for a predetermined number of samples.

In another embodiment, the third loop further includes increasing an order of the extrapolation, increasing the number of samples, determining one or more new stretch factors, and repeating the third loop using the increased order of extrapolation, the increased number of samples, and the new stretch factors. Thus, the embodiment provides improved accuracy of error mitigation estimates by increasing an order of the extrapolation and number of samples, determining new stretch factors, and repeating the third loop.

In another embodiment, the third loop includes increasing a circuit depth of the quantum computing circuit. Thus, the embodiment provides improved accuracy of error mitigation estimates by increasing the circuit depth of the quantum computing circuit.

Another embodiment further includes initializing a fourth loop, the fourth loop repeating the third loop for a predetermined number of iterations. Thus, the embodiment provides improved accuracy of error mitigation estimates by increasing a number of iterations.

In another embodiment, the fourth loop further includes: increasing an order of the extrapolation, increasing a circuit depth of the quantum computing circuit, increasing the number of samples, increasing the number of iterations, determining one or more new stretch factors, and repeating the fourth loop using the increased order of extrapolation, the increased circuit depth, the increased number of samples, and the new stretch factors. Thus, the embodiment provides improved accuracy of error mitigation estimates by increasing the circuit depth, the number of samples, and the number of iterations.

In another embodiment, the stretch factor is determined based upon a product of the stretch factor and a pulse width of the quantum processor being less than the coherence times. Thus, the embodiment provides for a stretch factor that operates within the performance capabilities of the quantum processor.

Another embodiment further includes pre-calibrating one or more primitive gates of the quantum computing circuit for each stretch factor. Thus, the embodiment improves the efficiency of providing error mitigation estimates by pre-calibrating the primitive gates of the quantum computing circuit.

In another embodiment, the extrapolation includes a Richardson extrapolation. Thus, the embodiment improves the efficiency of producing the error mitigation estimates by using a Richardson extrapolation algorithm.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 6 depicts graphs illustrating equivalence of amplifying noise strength to rescaling dynamics under an assumption of time-translation invariant noise;

DETAILED DESCRIPTION

Figure 1:
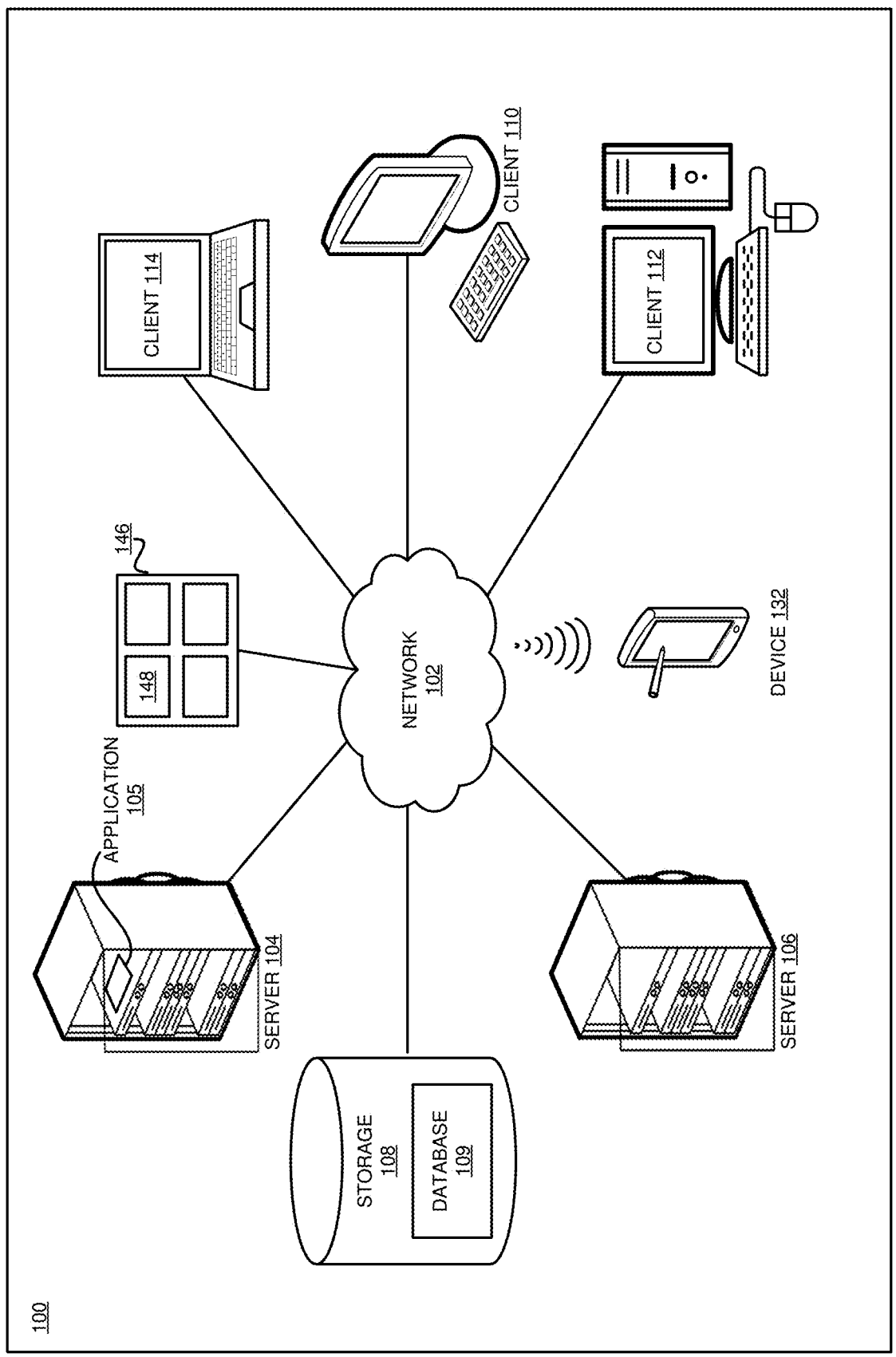
FIG. 1 depicts a block diagram of a network of data processing systems in which illustrative embodiments may be implemented.

The illustrative embodiments recognize that the presently available tools or solutions do not address these needs/problems or provide adequate solutions for these needs/problems. A theoretical proposal to mitigate such errors has recently been developed and described in "Error mitigation for short-depth quantum circuits", arXiv:1612.0205. In the absence of sampling noise, the accuracy of an expectation value can be improved by several orders of magnitude for reasonable noise strengths. However, a protocol for implementation of error mitigation on quantum computing hardware remains lacking. Furthermore, improvements are expected to be limited by the number of samples, leading to requiring very large experiment run times in the absence of qubit/cavity reset. The illustrative embodiments used to describe the invention generally address and solve the above-described problems and other related problems by implementing error mitigation for quantum computing machines.

One or more embodiments describe a protocol for the implementation of error mitigation of short-depth quantum computing circuits to significantly enhance the power of near-term quantum computers for computations based upon expectation values. One or more embodiments are directed to a protocol for improving the accuracy of hybrid quantum-classical optimization algorithms using error mitigation. One or more embodiments are directed to a system for implementing error mitigation by zero-noise extrapolation. In one or more embodiments, stretched unitary gates are implemented for error-mitigation, and a tune-up protocol for the stretched unitary gates is described.

One or more embodiments describe rescaling of single qubit and two qubit cross resonance gates. One or more embodiments describe evaluating error mitigated results from measurements on a quantum computing device. One or more embodiments describe an ordering scheme for measurements to handle fluctuations of incoherent noise in a quantum computing device.

An advantage that may be provided by at least one embodiment is that the described protocol does not require any additional qubits. Another advantage that may be provided by at least one embodiment is that the accuracy of expectation values of observables of interest for a range of reasonable noise strengths can be improved by several orders of magnitude, and is in principle set by the number of samples. Another advantage that may be provided by at least one embodiment is that the accuracy of hybrid quantum-classical algorithms may be improved by using error mitigated estimates of a cost function to generate a next set of control parameters.

Another advantage that may be provided by at least one embodiment is to provide for parallelization of gates for reducing trial state preparation time. Another advantage that may be provided by at least one embodiment is a microwave-only single qubit/cavity reset for maintaining qubit coherence, while enabling a large number of samples required for improvements with error mitigation. Another advantage that may be provided by at least one embodiment is to increase the capabilities of near-term quantum computers for quantum simulation, machine learning, and optimization.

In accordance with one or more embodiments, a gate is defined by a sequence of microwave pulses that are parameterized by waveform, amplitude and time. In accordance with one or more embodiments, a stretch factor $c_i$ refers to a stretch in the time (or amplitude) of a gate of interest of gate time $t_0$ (or amplitude $A_0$). Therefore, the time (or amplitude) of the stretched gate is then $c_i*t_0$ (or $c_i*A_0$). In accordance with one or more embodiments, a stretch factor may include but is not limited to a scaling of the pulse time, rise-fall times, wait times, etc. of a gate of interest.

In accordance with one or more embodiments, an entangler is defined by a sequence of gates that entangle all the qubits utilized in a circuit. In one or more embodiments, a hardware efficient short depth circuit is defined as an interleaved sequence of single qubit gates that perform arbitrary rotations and entanglers. In one or more embodiments, a quantum circuit depth d is defined as the number of entanglers used in the short depth circuit. In accordance with one or more embodiments, samples S refers to the number of repetitions of a given measurement.

An embodiment can be implemented as a combination of certain q-computing hardware components and a software application. An implementation of the software application portion of an embodiment, or one or more components thereof, can be configured as a modification of an existing quantum computing environment, with the software application executing in some combination of (i) the quantum computing device itself, (ii) a data processing system, such as a server, communicating with the quantum computing device over short-range radio or a wired or wireline local area network (LAN), and (iii) a data processing system communicating with the quantum computing device over a wide area network (WAN).

A quantum circuit can be expressed in terms of evolution under a time-dependent drive Hamiltonian:

$$K(t)=\Sigma_\alpha J_\alpha(t)P_\alpha \quad \text{(EQUATION 1)}$$

for a time T, where each $P_\alpha$ represents a N-qubit Pauli operator, and $J_\alpha$ is the time-dependent strength of the associated interaction. The expectation value of an observable of interest $E_K(\lambda)$ for a state prepared by the drive K in the presence of noise can be expressed as a power series around its zero-noise value $E^*$ as:

$$E_K(\lambda)=E^*+\Sigma_{k=1}^n a_k\lambda^k+O(\lambda^{n+1}) \quad \text{(EQUATION 2)}$$

where $\lambda\ll1$ is a small noise parameter, and the coefficients in the expansion $a_k$ are dependent on specific details of the noise model. In n additional estimates to the expectation value can be obtained for precisely amplifying the noise rate by stretch factors $c_i$ for i=1, 2 . . . n, an improved approximation to noise-less expectation value $E^*$ with a reduced error order $O(\lambda^{n+1})$ can be constructed as:

$$\hat{E}_K^n(\lambda)=\Sigma_{i=0}^n\gamma_i\hat{E}_K(c_i\lambda) \quad \text{(EQUATION 3)}$$

such that for a chosen set of stretch factors $c_i$, the coefficients $\gamma_i$ are solutions to the equations $\Sigma_{i=0}^n\gamma_i c_i^k=0$ for k=1, 2 . . . , n and $\Sigma_{i=0}^n\gamma_i=1$.

It can be shown measurements of the expectation value after evolution under a scaled drive for a time $c_iT$ (within a coherence window) is equivalent to a measurement under an amplified noise strength $c_i\lambda$. Accordingly, a rescaled Hamiltonian evolved over a time cT for the quantum computing circuit can be expressed as:

$$K_c(t)=\Sigma_\alpha c^{-1}J_\alpha(c^{-1}t)P_\alpha \quad \text{(EQUATION 4)}$$

Mitigated estimates of the expectation values are then obtained using Richardson extrapolation or other known extrapolation techniques as further described herein with respect to certain embodiments.

An embodiment describes a protocol for implementing error mitigation for quantum computing machines. In the embodiment, an application measures time correlations of noise within a short-depth quantum computing circuit of a quantum processor, and measures coherence times of the qubits of the quantum processor. In one or more embodiments, a coherence time is a time over which a quantum superposition state of a qubit survives. In a particular embodiment, qubit operations of the quantum processor are implemented using a microwave control hardware architecture configured to produce modulated microwave pulses. In the embodiment, the application determines an order of Richardson extrapolation and a number of samples S to be iterated during the error mitigation procedure. In the embodiment, the application determines a number of stretch factors $c_i$ such that $c_i*t_0<$coherence times where $t_0$ is a time duration or pulse width of a microwave pulse. In a particular embodiment, each stretch factor $c_i$ is determined in a randomized manner for a predetermined range. For every stretch factor $c_i$, the application pre-calibrates primitive gates for different gate times/amplitudes with appropriate scaling according to the particular stretch factor $c_i$.

In the embodiment, the application initiates a loop over the number of samples S, a loop over a number of expectation values of interest, and a loop over the number of stretch factors $c_i$. For each stretch factor $c_i$, the application initializes the qubits in their respective ground states, runs the short depth circuit with the current stretch factor $c_i$, performs single-qubit post-rotations associated with the expectation values of interest, measures qubit states of each qubit, and resets the qubit/cavity to the ground state as further described herein. In the embodiment, the process repeats the iterations over the expectation value of interest loop and the number of samples loop.

After each of the three loops is completed, the application obtains a mitigated estimate for the expectation values of interest using the expectation values measured for different stretch factors. In one or more embodiments, the application determines the mitigated estimate using Richardson extrapolation over the expectation values. In one or more embodiments, the application adaptively increases the order of the Richardson extrapolation, and the number of samples, determines new stretch factors $c_i$ for the new order and number of samples, and repeats the three loops until saturation is reached or until limited by the quantum processor.

The illustrative embodiments are described with respect to certain types of quantum computing circuits, qubits, error mitigation protocols, q-processors, extrapolation operations, algorithms, locations of embodiments, additional data, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
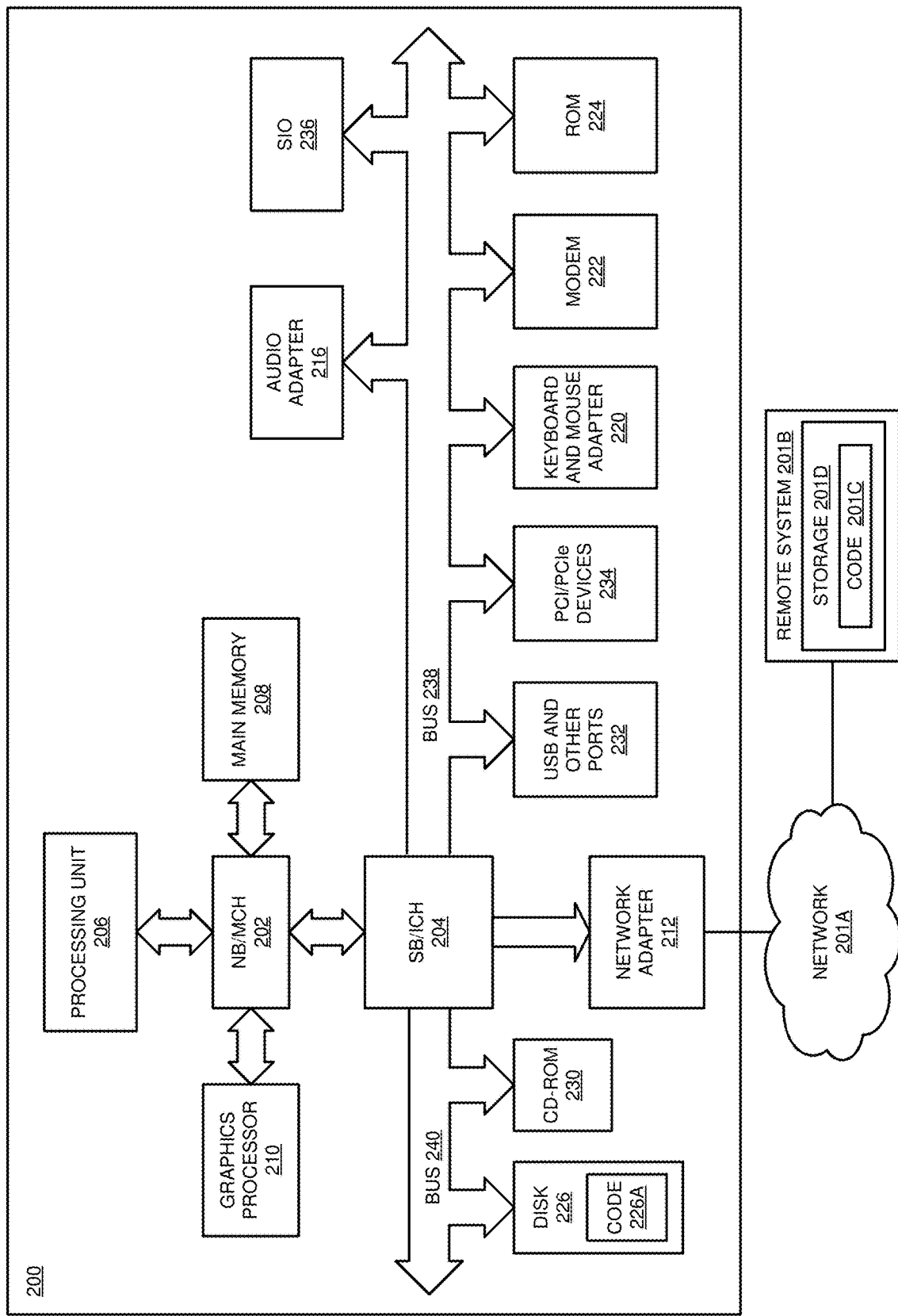
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108 including a database 109 Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

A quantum computing device 146 comprises one or more q-processors 148. A currently viable qubit is an example of q-processor 148. Application 105 implements an embodiment described herein. Application 105 operates on quantum computing device 148.

Quantum computing device 148 may couple to network 102 using wired connections, wireless communication protocols, or other suitable data connectivity. Clients 110, 112, and 114 may be, for example, personal computers or network computers. Network 102 may represent a collection of networks and gateways that use the Transmission Control Protocol/Internet Protocol (TCP/IP) and other protocols to communicate with one another. FIG. 1 is intended as an example, and not as an architectural limitation for the different illustrative embodiments.

Data processing environment 100 as a whole may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a conventional data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
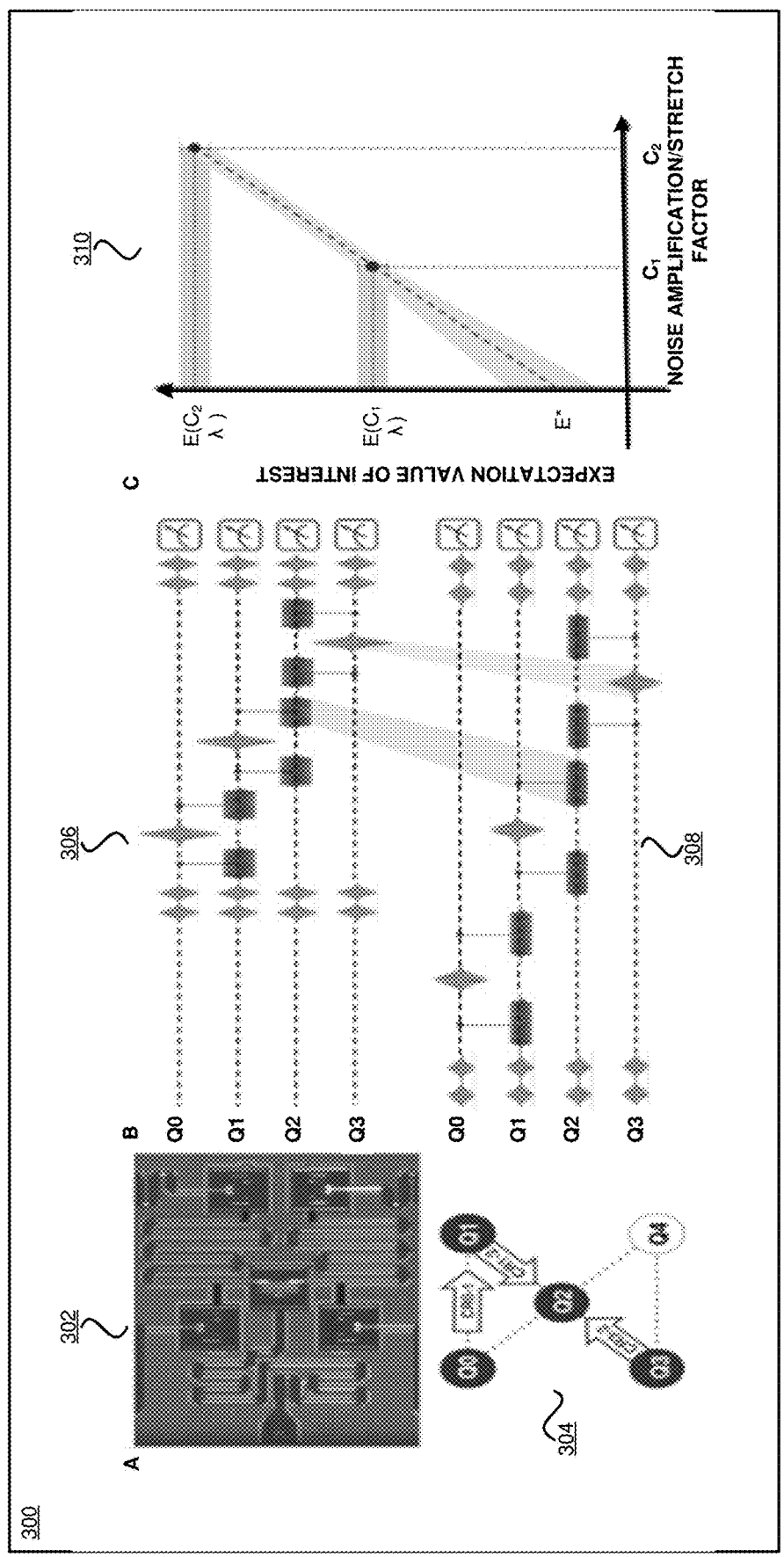
FIG. 3 depicts a simplified diagram of a superconducting quantum processor in accordance with an illustrative embodiment.

With reference to FIG. 3, this figure depicts a simplified diagram of a superconducting quantum processor 302 in accordance with an illustrative embodiment. Superconducting quantum processor 302 is shown in an optical micrograph view. A schematic view 304 shows quantum processor 302 as including five transmon qubits with coupling provided by two superconducting coplanar waveguide (CPW) resonators. In a particular embodiment, quantum processor 302 is comprised of fixed-frequency Josephson-junction-based transmon qubits, with individual superconducting CPW resonators for qubit control and readout, and another pair of CPW resonators providing qubit connectivity. FIG. 3 further illustrates an equivalency between a measurement under an amplified noise strength 306 and an expectation value measurement after rescaled state preparation 308 under an assumption of time-translation invariant noise. FIG. 3 further illustrates a graph 310 results of error mitigation results according to an embodiment. Graph 310 depicts an example of how expectation values at noise amplification or stretch factors $c_1$ and $c_2$, can be used to extrapolate to a zero-noise estimate E*. Graph 310 includes a first-order Richardson extrapolation to the zero-noise limit showing that the variance of the mitigated estimate of the expectation value of interest is crucially dependent on the variance of the unmitigated measurements and the stretch factors $c_i$.

Figure 4:
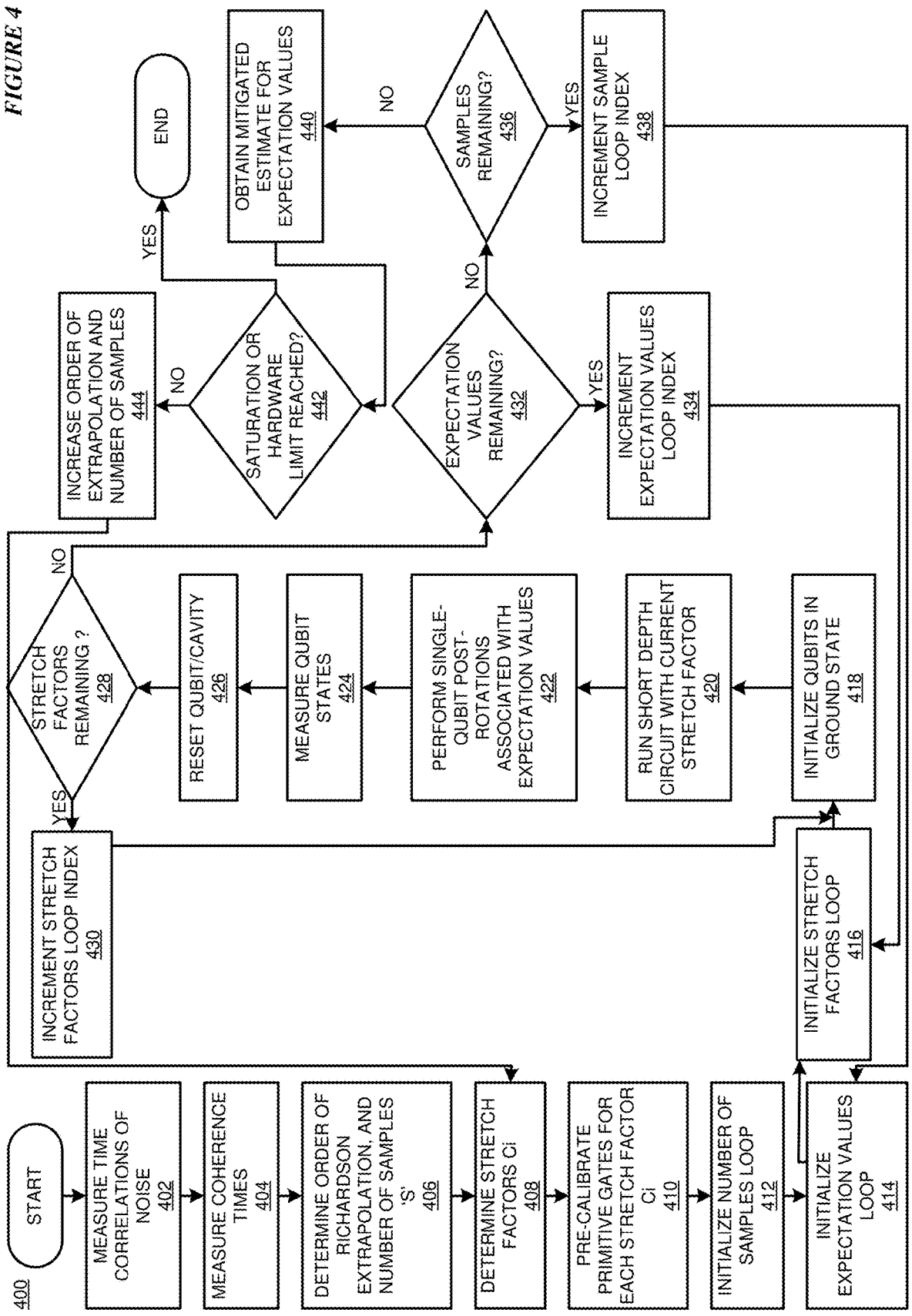
FIG. 4 depicts a flowchart of a process for error mitigation for a quantum computing machine in accordance with an illustrative embodiment.

With reference to FIG. 4, this figure depicts a flowchart of a process for error mitigation for a quantum computing machine in accordance with an illustrative embodiment. In an embodiment, process 400 can be implemented in application 105 using quantum computing device 146 of FIG. 1.

In block 402, application 105 measures time correlations of noise within a short-depth quantum computing circuit of a quantum processor. In block 404, application 105 measures coherence times of the qubits of the quantum processor. In block 406, application 105 determines an order of Richardson extrapolation and a number of samples S. In block 408, application 105 determines a number of stretch factors $c_i$ such that $c_i*t_0$<coherence times where $t_0$ is a time duration of a microwave pulse of the quantum processor. In one or more embodiments, the application determines the stretch factors based upon the time correlations of the noise and the coherence times. In block 410, application 105 pre-calibrates primitive gates for each stretch factor $c_i$ for different gate times/amplitudes with appropriate scaling according to the particular stretch factor $c_i$.

In block 412, application 105 initializes a number of samples loop to perform iterations for each sample S. In block 414, application 105 initializes an expectation values loop to perform iterations for each expectation value. In block 416, application 105 initializes a stretch factors loop to perform iterations for each stretch factor $c_i$.

In block 418, application 105 initializes the qubits in their respective ground states. In block 420, application 105 runs or executes the short depth circuit with the current stretch factor $c_i$. In block 422, application 105 performs single-qubit post-rotations associated with expectation values of interest. In block 424, application 105 measures qubit states of each qubit to determine the expectation values of interest. In block 426, application 105 resets the qubit/cavity to the ground state for each qubit. Blocks 418 to block 426 represent a single measurement of the expectation value of interest, for the quantum state prepared with the current stretch factor $c_i$.

In block 428, application 105 determines whether there are any stretch factors remaining. If the application determines that stretch factors remain, in block 430 application 105 increments the stretch factors loop index and process 400 returns to block 418. If application 105 determines that no stretch factors remain, process 400 continues to block 432.

In block 432, application 105 determines whether there are any expectation values remaining. If the application determines that expectation values remain, in block 434 application 105 increments the expectation values loop index and process 400 returns to block 416. If application 105 determines that no expectation values remain, process 400 continues to block 436.

In block 436, application 105 determines whether there are any samples remaining. If application 105 determines that samples remain, in block 438 application 105 increments the sample loop index and process 400 returns to block 414. If application 105 determines that no samples remain, process 400 continues to block 440.

In block 440, application 105 obtains a mitigated estimate for the expectation values of interest using the expectation values determined for the different stretch factors. In one or more embodiments, application 105 determines the mitigated estimate using Richardson extrapolation over the expectation values for each stretch factor.

In block 442, application 105 determines whether saturation or a quantum hardware limit that may preclude benefiting from increasing the order of the extrapolation or increasing number of samples is reached. If application 105 determines that saturation or a hardware limit is reached, process 400 ends. If application 105 determines that saturation or a hardware limit has not been reached, process 400 continues to block 444. In block 444, application 105 increases the order of the extrapolation and the number of samples and returns to block 408 in which new stretch factors $c_i$ for the new order and number of samples are determined, and repeats the three loops until saturation is reached or until limited by the quantum hardware of the quantum processor. Accordingly, a mitigated estimate is determined for the quantum computing machine.

Figure 5A:
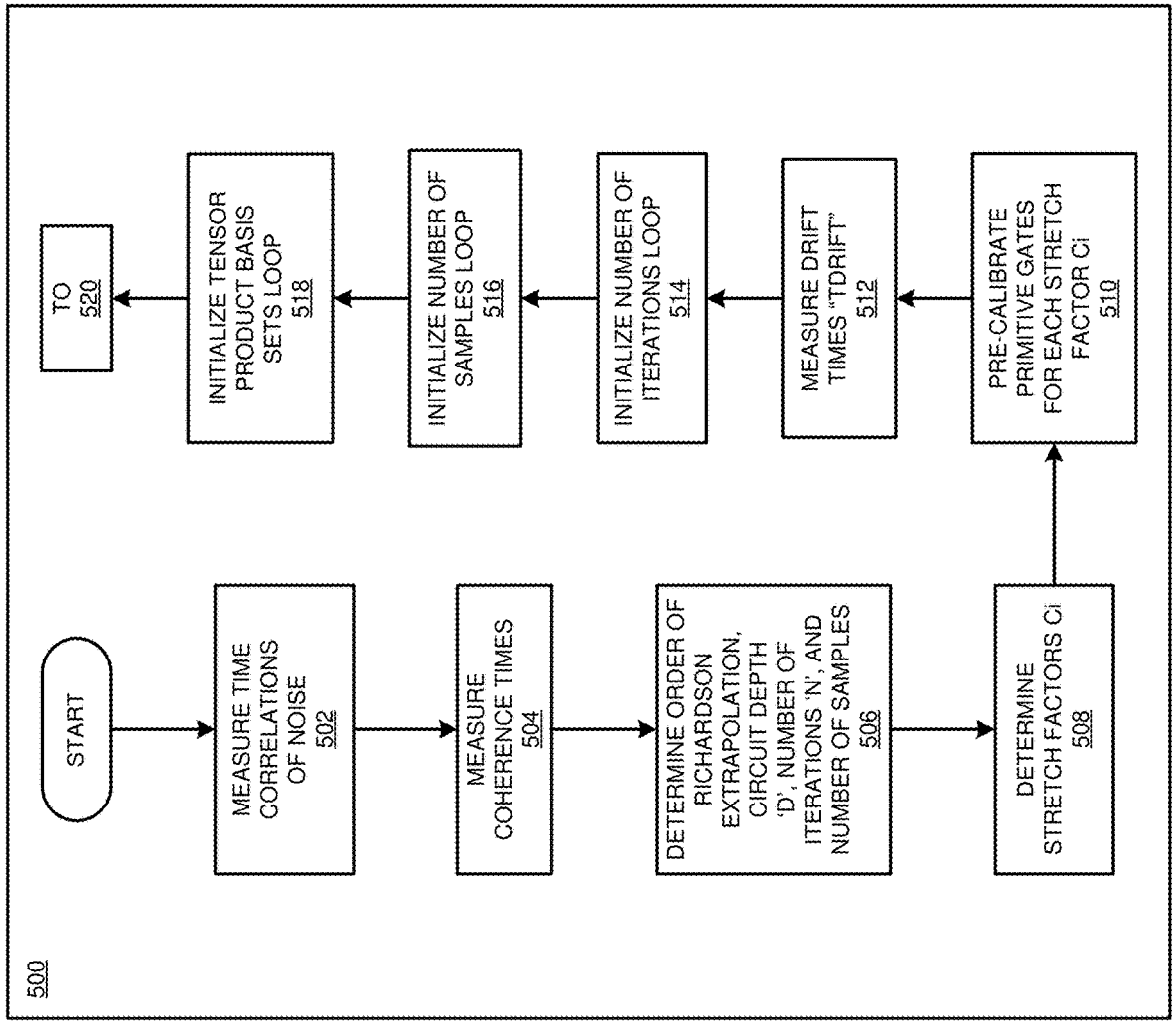
FIG. 5A-5B depict a flowchart of another process for error mitigation for a quantum computing machine in accordance with an illustrative embodiment.
Figure 5B:
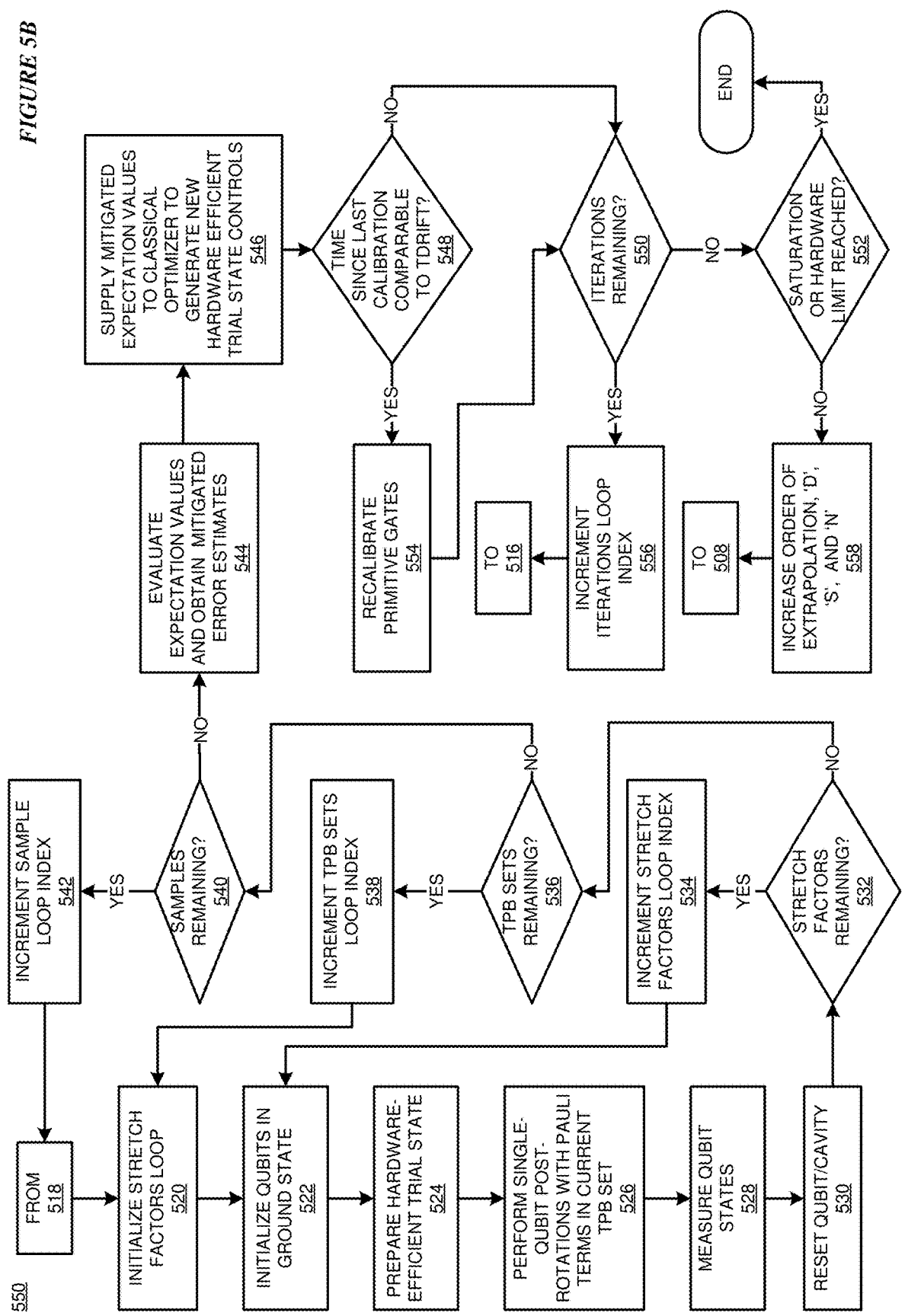

With reference to FIGS. 5A-5B, these figures depict a flowchart of another process for error mitigation for a quantum computing machine in accordance with an illustrative embodiment. The embodiment of FIG. 5 implements a protocol for error mitigation in quantum optimization, for instance, with hardware-efficient trial states. For hardware-efficient trial states, trial states are chosen that can be efficiently generated in current quantum hardware. In an embodiment, process 500 can be implemented in application 105 using quantum computing device 146 of FIG. 1.

In block 502, application 105 measures time correlations of noise within a short-depth quantum computing circuit of a quantum processor. In block 504, application 105 measures coherence times of the qubits of the quantum processor. In block 506, application 105 determines an order of Richardson extrapolation, a circuit depth D, a number of iterations in the optimization N, and a number of samples S. In block 508, application 105 determines a number of stretch factors $c_i$ such that $c_i*t_0$<coherence times where $t_0$ is a time duration of a microwave pulse of the quantum processor. In one or more embodiments, the application determines the stretch factors based upon the time correlations of the noise and the coherence times. In block 510, application 105 pre-calibrates primitive gates for each stretch factor $c_i$ for different gate times/amplitudes with appropriate scaling according to the particular stretch factor $c_i$. In block 512, application 105 measure associated times $T_{drift}$ for drifts in calibration of the primitive gates.

In block 514, application 105 initializes a number of iterations loop for each iteration N. In block 516, application 105 initializes a number of samples loop to perform iterations for each sample S. In block 518, application 105 initializes tensor product basis loop to loop over tensor product basis (TPB) sets of Pauli terms in a target Hamiltonian. In block 520, application 105 initializes a stretch factors loop to perform iterations for each stretch factor $c_i$.

In block 522, application 105 initializes the qubits in their respective ground states. In block 524, application 105 prepares a hardware-efficient trial state corresponding to the current circuit depth D and the current stretch factor $c_i$. In block 526, application 105 performs single-qubit post-rotations associated Pauli terms in the current TPB set. In block 528, application 105 measures qubit states of each qubit. In block 530, application 105 resets the qubit/cavity to the ground state for each qubit. Blocks 522-530 represent a single measurement sample of the expectation value associated with the current TPB set, for the current hardware-efficient trial state prepared with the current depth D and stretch factor $c_i$.

In block 532, application 105 determines whether there are any stretch factors remaining. If the application determines that stretch factors remain, in block 534 application 105 increments the stretch factors loop index and process 500 returns to block 522. If application 105 determines that no stretch factors remain, process 500 continues to block 536.

In block 536, application 105 determines whether there are any TPB sets remaining. If the application determines that TBP sets remain, in block 538 application 105 increments the TBP sets loop index and process 500 returns to block 520. If application 105 determines that no TPB sets remain, process 500 continues to block 540.

In block 540, application 105 determines whether there are any samples remaining. If application 105 determines that samples remain, in block 542 application 105 increments the sample loop index and process 500 returns to block 518. If application 105 determines that no samples remain, process 500 continues to block 544. In block 544, application 105 evaluates the expectation values of interest and obtains mitigated error estimates for the expectation values of interest using the expectation values determined for the different stretch factors. In one or more embodiments, application 105 determines the mitigated estimate using Richardson extrapolation over the expectation values for each stretch factor to a zero noise limit. In a particular embodiment, application 105 obtains the mitigated estimate for the expectation values by obtain mitigated estimate using Richardson extrapolation of the expectation values measured for different stretch factors to the zero noise limit. In block 546, application 105 supplies the mitigated expectation values to a classical optimizer to generate control parameters for a new hardware-efficient trial state.

In block 548, application 105 determines if a time since last calibration is comparable to, for example, exceeds, the drift time $T_{drift}$. If the time since last calibration is comparable to $T_{drift}$, in block 554 application 105 recalibrates the primitive gates and process 500 continues to block 550. If the time since last calibration is not comparable to $T_{drift}$, process 500 continues to block 550.

In block 550, application 105 determines whether there are any iterations remaining. If application 105 determines that iterations remain, in block 556 application 105 increments the iterations loon index and returns to block 516. If application 105 determines that no iterations remain, process 500 continues to block 552.

In block 552, application 105 determines whether saturation or a quantum hardware limit that may preclude increasing the order of the extrapolation or increasing number of samples is reached. If application 105 determines that saturation or a hardware limit is reached, process 500 ends. If application 105 determines that saturation or a hardware limit has not been reached, process 500 continues to block 558. In block 558, application 105 increases one or more of the order of the extrapolation, the circuit depth D, the number of samples S, and the number of iterations N and returns to block 508 in which new stretch factors $c_i$ for the new order, new circuit depth D, number of samples S, and/or iterations N is determined, repeats the four loops until saturation is reached or until limited by the quantum hardware of the quantum processor. Accordingly, an error mitigated result of the optimization is determined for the quantum computing machine.

In another embodiment, for a Trotter-based quantum simulation approach, application 105 adaptively decreases a step size of a decomposition, until saturation is reached or until limited by the quantum computing hardware.

With reference to FIG. 6, FIG. 6 depicts graphs illustrating equivalence of amplifying noise strength to rescaling dynamics under an assumption of time-translation invariant noise. Graph 602 illustrates noise of a quantum computing circuit evolved for a time T with a time-dependent drive Hamiltonian:

$$K(t)=\Sigma_\alpha J_\alpha(t)P_\alpha \qquad \text{(EQUATION 1)}$$

where each $P_\alpha$ represents a N-qubit Pauli operator, and $J_\alpha$ is the strength of the associated interaction and an expectation value $E_K(\lambda)$ is measured.

Graph 604 illustrates noise of the quantum computing circuit for a rescaled Hamiltonian evolved over a time cT for the quantum computing circuit can be expressed as:

$$K_c(t)=\Sigma_\alpha c^{-1}J_\alpha(c^{-1}t)P_\alpha \qquad \text{(EQUATION 4)}$$

where an expectation value $E_K(C\lambda)$ is measured.

Figure 7:
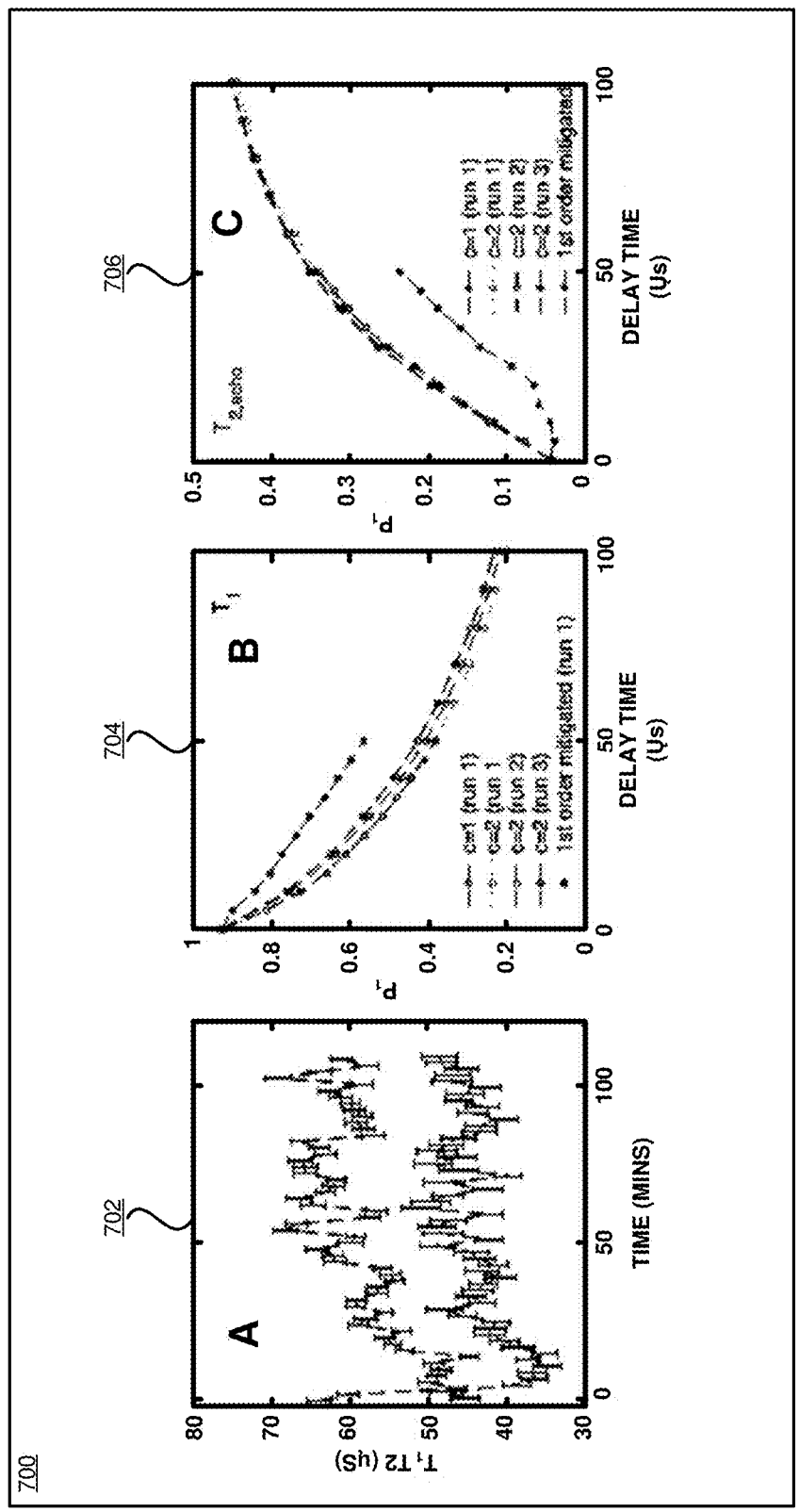
FIG. 7 depicts an ordering scheme for measurements to handle non-static fluctuation of incoherent noise in a quantum computing circuit.

With reference to FIG. 7, FIG. 7 depicts an ordering scheme 700 for measurements to handle non-static fluctuation of incoherent noise in a quantum computing circuit. Graph 702 depicts fluctuations over time for an energy relaxation times T1 and coherence times T2 in superconducting qubits of the quantum computing circuit. In accordance with one or more embodiments, an ordering scheme for measurements to handle non-static fluctuation of incoherent noise includes two loops as follows:

```
For current_sample_number in (Total number of
   samples):
      For current_stretch in (all stretch
      factors):
         Measure expectation value
         Initialize qubit(s)
      End
End
``` where current_sample_number is the number of the current sample out of a total number of samples, current_stretch is a current stretch factor out of all of the stretch factors for which an expectation value is first measured and one or more qubits of the quantum computing circuit are initialized. In one or more embodiments, the ordering scheme may be integrated with fast initialization/reset protocols to reduce the effects of coherence time fluctuations.

Graph 704 illustrates error mitigation for sequence T1 in which the ordering scheme described above is used. As shown in graph 704, the average relaxation rates is the same for the stretched measurements. When averaged separately, the average relation rate is different for the stretched measurements due to fluctuations in coherence time, leading to undercorrected or overcorrected mitigated estimates Graph 706 illustrates error mitigation for an T2 echo sequence in which the ordering scheme described above is used. As shown in graph 706, the average relaxation rate is the same for the stretched measurements, when ordered as per the scheme described above.

Figure 8:
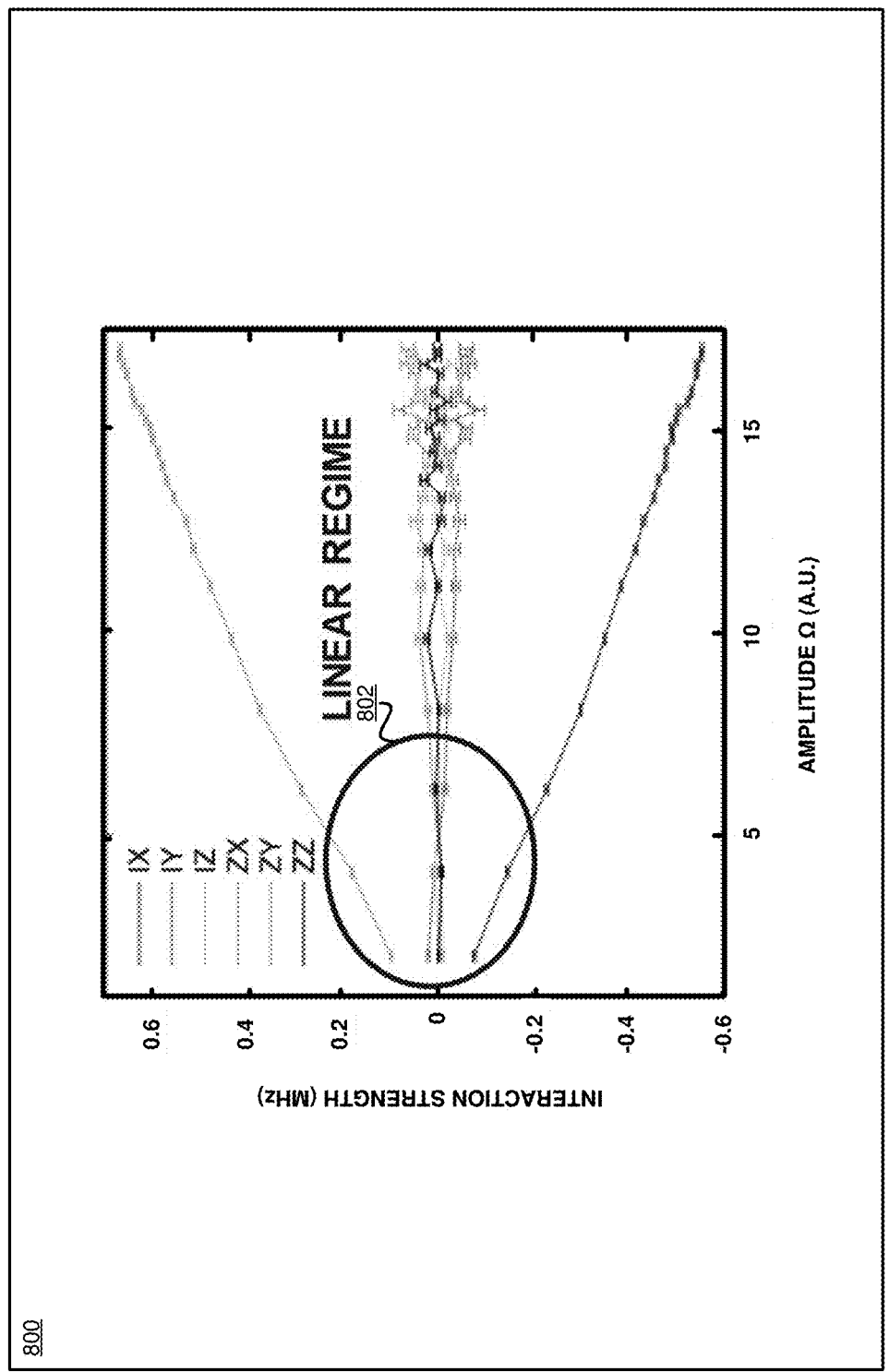
FIG. 8 depicts a graph of interaction strength versus microwave pulse amplitude for gates of a quantum computing circuit operating in a linear regime in accordance with an illustrative embodiment.

With reference to FIG. 8, FIG. 8 depicts a graph 800 of interaction strength versus microwave pulse amplitude for different terms (IX, IY, IZ, ZX, ZY, ZZ) in the two-qubit cross resonance gate. Graph 802 highlights a linear regime of operation, such that the strengths of the interaction would scale linearly with the stretch factors, in order to achieve physical extrapolations.

Figure 9:
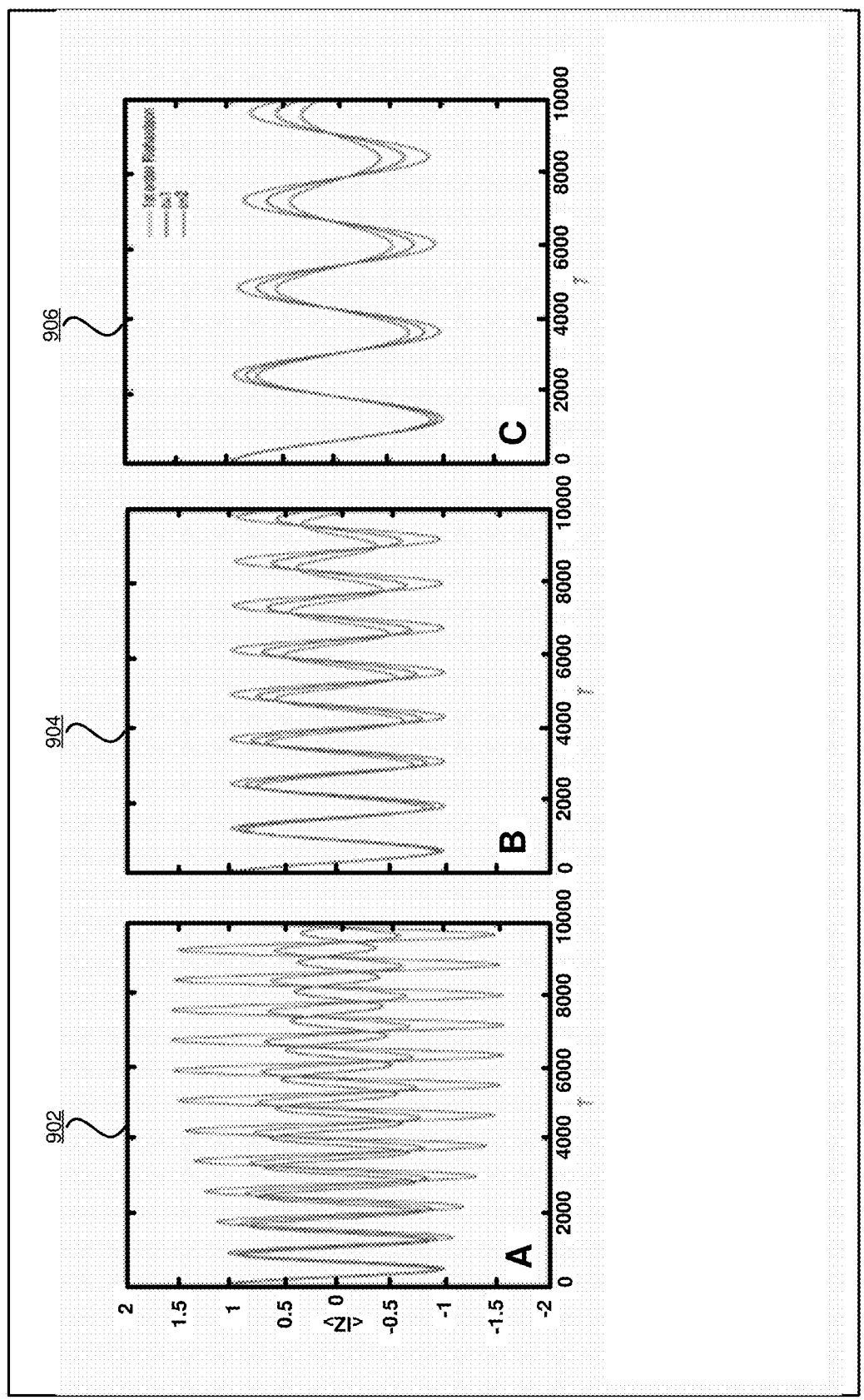
FIG. 9 depicts a graph of simulated noisy expectation values and the associated mitigated estimates for gates of a quantum computing circuit for a number of stretch factors in accordance with an illustrative embodiment.

With reference to FIG. 9, FIG. 9 depicts a graph 900 of simulated noisy expectation values and the associated mitigated estimates over a time T for gates of a quantum computing circuit for a number of stretch factors in accordance with an illustrative embodiment. Graph 902 illustrates mitigated estimates which have taken on unphysical values (e.g., greater 1 or less than −1) in the presence of strong non-linearities in the amplitude dependence of the interactions of the gate. Graph 904 and graph 906 each illustrate mitigated estimates in which drive amplitude is constrained to a more linear regime to prevent the mitigated estimates from producing unphysical values.

Figure 10:
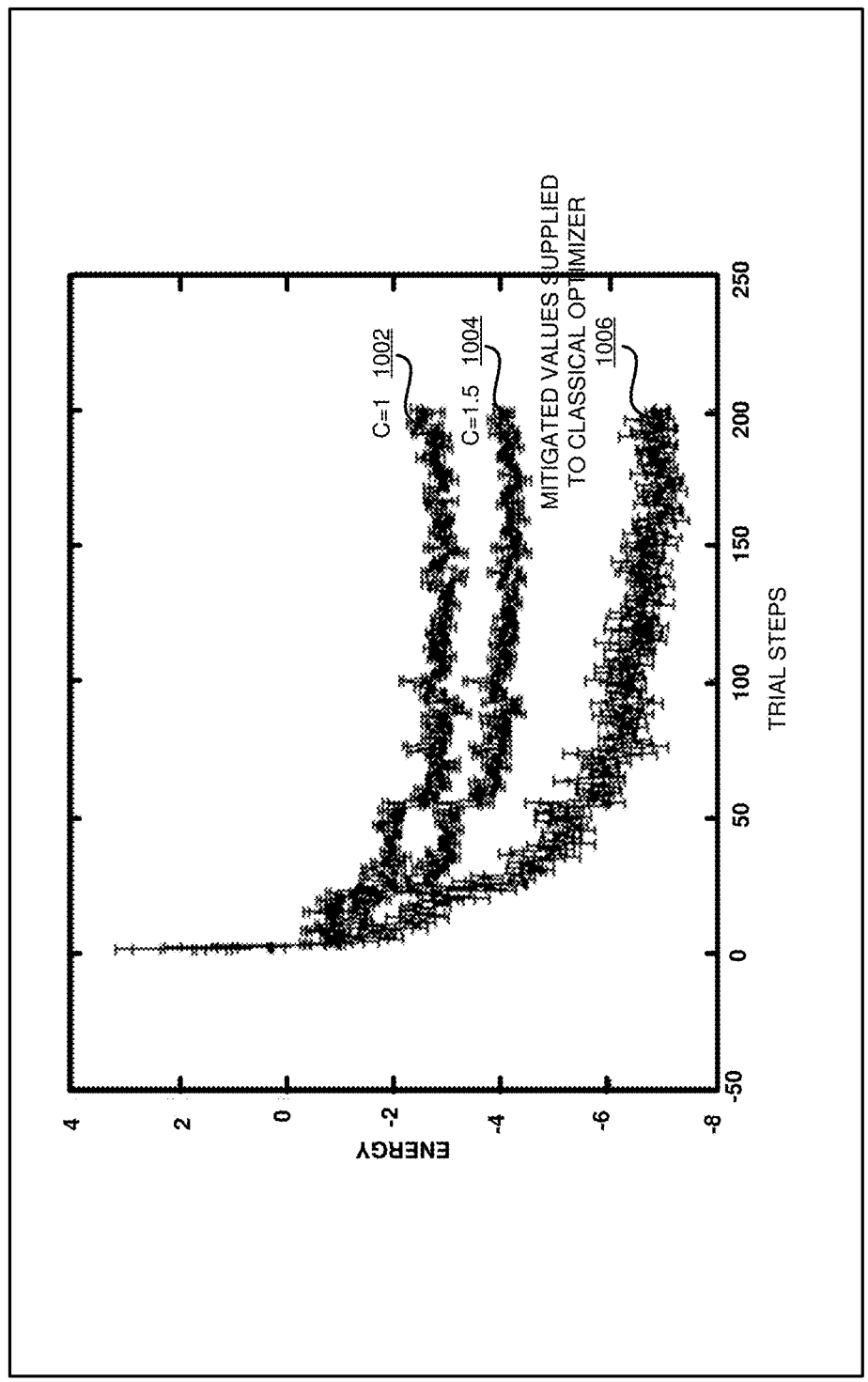
FIG. 10 depicts a graph of mitigated values of cost function/energy for a number of stretch factors over a number of trial steps in accordance with an illustrative embodiment.

With reference to FIG. 10, FIG. 10 depicts a graph of mitigated values of cost function/energy for a number of stretch factors over a number of trial steps in accordance with an illustrative embodiment. Plot 1002 illustrates values of cost function/energy for a stretch factor c=1, and plot 1004 illustrates values of cost function/energy for a stretch factor c=1.5. Plot 1006 illustrates mitigated values of cost function/energy obtained from an extrapolation of the noisy values of plot 1002 and plot 1004 supplied to a classical optimizer, to update the states prepared at every iteration.

Figure 11:
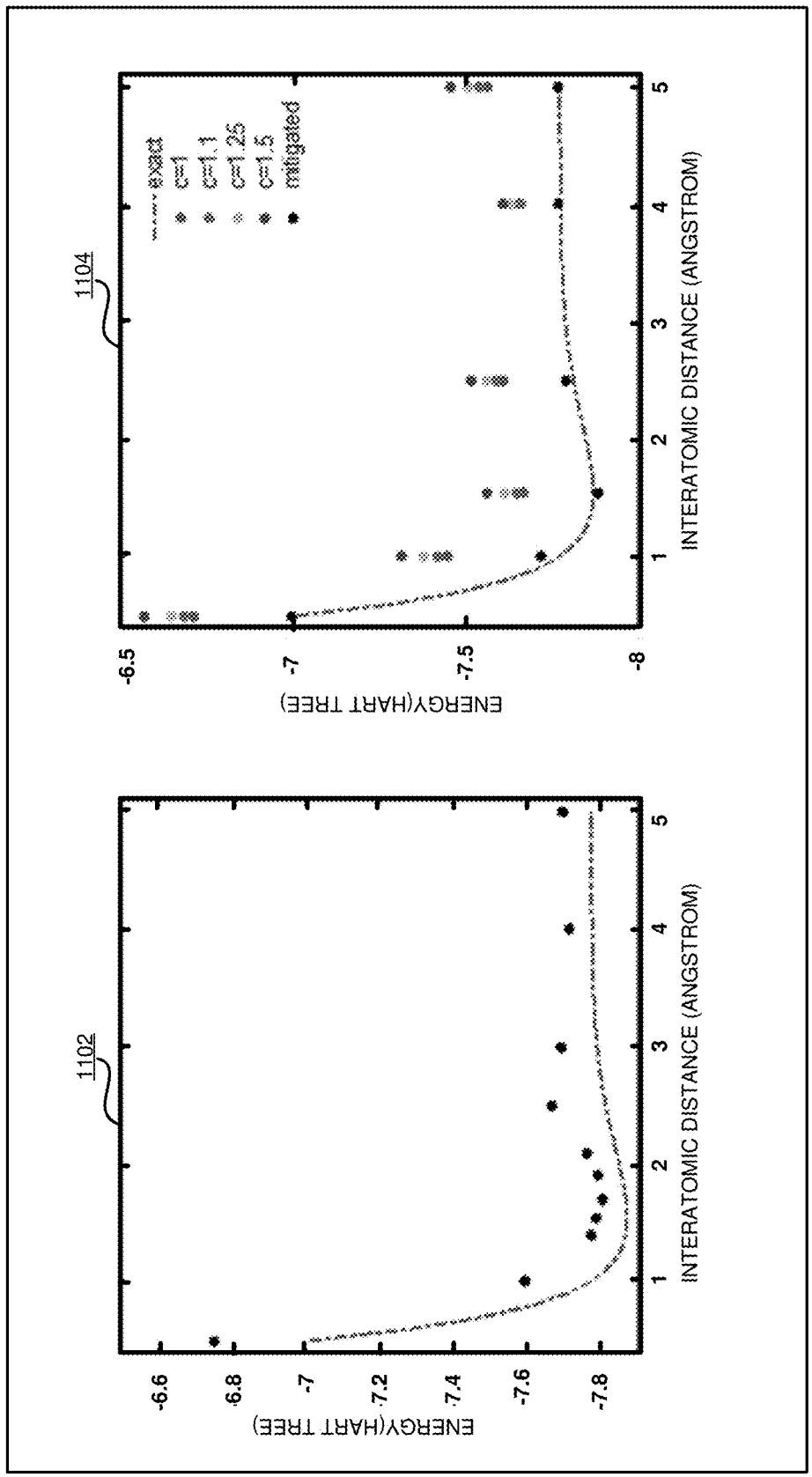
FIG. 11 depicts a graph of an improvement of a quantum chemistry simulation in an example implementation of error mitigation for quantum computing machines in accordance with an illustrative embodiment.

With reference to FIG. 11, FIG. 11 depicts a graph of an improvement of a quantum chemistry simulation in an example implementation of error mitigation for quantum computing machines in accordance with an illustrative embodiment. Graph 1102 illustrates expectation value estimates of a quantum chemistry simulation of lithium hydride (LiH) without error mitigation. Graph 1104 illustrates mitigated expectation value estimates of the quantum chemistry simulation with error mitigation as described herein. As shown in FIG. 11, the mitigated expectation value estimates of graph 1104 are much closer to the exact theoretical values than the expectation values of graph 1102. Accordingly, in accordance with one or more embodiments, implementation of the error mitigation procedures described herein may extend computational power of quantum processors without requiring significant improvement in coherence times, and without requiring additional quantum resources.

Thus, a computer implemented method, system or apparatus, and computer program product are provided in the illustrative embodiments for implementation of error mitigation for quantum computing machines and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, including but not limited to computer-readable storage devices as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
    determining one or more time correlations of noise within a quantum computing circuit of a quantum processor, the quantum computing circuit including one or more qubits;
    determining a coherence time for each qubit;
    determining one or more stretch factors based upon the one or more time correlations of the noise and the coherence time(s);
    initializing a first loop, the first loop performing for each of the one or more stretch factors:
        initializing the one or more qubits to a ground state;
        executing the quantum computing circuit with the one or more stretch factors;
        performing one or more single-qubit post-rotations associated with one or more expectation values;
        measuring a state of each qubit to determine the one or more expectation values of interest; and
        resetting each qubit to the ground state; and
    determining a mitigated estimate for the one or more expectation values based upon an extrapolation of the one or more expectation values determined for each stretch factor.

2. The method of claim 1, further comprising:
    initializing a second loop, the second loop repeating the first loop for a predetermined number of the one or more expectation values of interest.

3. The method of claim 2, further comprising:
    initializing a third loop, the third loop repeating the second loop for a predetermined number of samples.

4. The method of claim 3, wherein the third loop further includes:
    increasing an order of the extrapolation;
    increasing the number of samples;
    determining one or more new stretch factors; and
    repeating the third loop using the increased order of extrapolation, the increased number of samples, and the one or more new stretch factors.

5. The method of claim 3, wherein the third loop includes increasing a circuit depth of the quantum computing circuit.

6. The method of claim 3, further comprising:
    initializing a fourth loop, the fourth loop repeating the third loop for a predetermined number of iterations.

7. The method of claim 6, wherein the fourth loop further includes:
    increasing an order of the extrapolation;
    increasing a circuit depth of the quantum computing circuit;
    increasing the number of samples;
    increasing the number of iterations;

determining one or more new stretch factors; and repeating the fourth loop using the increased order of extrapolation, the increased circuit depth, the increased number of samples, and the one or more new stretch factors.

8. The method of claim 1, wherein the one or more stretch factors are determined based upon a product of a stretch factor and a pulse width of the quantum processor being less than the coherence time(s).

9. The method of claim 1, further comprising:

pre-calibrating one or more primitive gates of the quantum computing circuit for each stretch factor.

10. The method of claim 1, wherein the extrapolation includes a Richardson extrapolation.

11. A computer usable program product comprising one or more computer-readable storage media, and program instructions stored on at least one of the one or more storage media, the stored program instructions comprising:

program instructions to determine one or more time correlations of noise within a quantum computing circuit of a quantum processor, the quantum computing circuit including one or more qubits;

program instructions to determine a coherence time for each qubit;

program instructions to determine one or more stretch factors based upon the one or more time correlations of the noise and the coherence time(s);

program instructions to initialize a first loop, the first loop performing for each of the one or more stretch factors:

initializing the one or more qubits to a ground state;

executing the quantum computing circuit with the one or more stretch factors;

performing one or more single-qubit post-rotations associated with one or more expectation values;

measuring a state of each qubit to determine the one or more expectation values of interest; and resetting each qubit to the ground state; and program instruction to determine a mitigated estimate for the one or more expectation values based upon an extrapolation of the one or more expectation values determined for each stretch factor.

12. The computer usable program product of claim 11, further comprising: program instructions to initialize a second loop, the second loop repeating the first loop for a predetermined number of the one or more expectation values of interest.

13. The computer usable program product of claim 12, further comprising:

program instructions to initialize a third loop, the third loop repeating the second loop for a predetermined number of samples.

14. The computer usable program product of claim 13, wherein the third loop further includes:

program instructions to increase an order of the extrapolation;

program instructions to increase the number of samples;

program instructions to determine one or more new stretch factors; and program instructions to repeat the third loop using the increased order of extrapolation, the increased number of samples, and the one or more new stretch factors.

15. The computer usable program product of claim 13, wherein the third loop includes program instructions to increase a circuit depth of the quantum computing circuit.

16. The computer usable program product of claim 13, further comprising:

program instructions to initialize a fourth loop, the fourth loop repeating the third loop for a predetermined number of iterations.

17. The computer usable program product of claim 11, wherein the computer usable code is stored in a computer readable storage device in a data processing system, and wherein the computer usable code is transferred over a network from a remote data processing system.

18. The computer usable program product of claim 11, wherein the computer usable code is stored in a computer readable storage device in a server data processing system, and wherein the computer usable code is downloaded over a network to a remote data processing system for use in a computer readable storage device associated with the remote data processing system.

19. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to determine one or more time correlations of noise within a quantum computing circuit of a quantum processor, the quantum computing circuit including one or more qubits;

program instructions to determine a coherence time for each qubit;

program instructions to determine one or more stretch factors based upon the one or more time correlations of the noise and the coherence time(s);

program instructions to initialize a first loop, the first loop performing for each of the one or more stretch factors:

initializing the one or more qubits to a ground state;

executing the quantum computing circuit with the one or more stretch factors;

performing one or more single-qubit post-rotations associated with one or more expectation values;

measuring a state of each qubit to determine the one or more expectation values of interest; and resetting each qubit to the ground state; and program instruction to determine a mitigated estimate for the one or more expectation values based upon an extrapolation of the one or more expectation values determined for each stretch factor.

20. The computer system of claim 19, further comprising:

program instructions to initialize a second loop, the second loop repeating the first loop for a predetermined number of the one or more expectation values of interest.

* * * * *